Feb. 22, 1966  W. C. SCHMIDT  3,235,905
HIDE PEELER
Filed Dec. 16, 1963
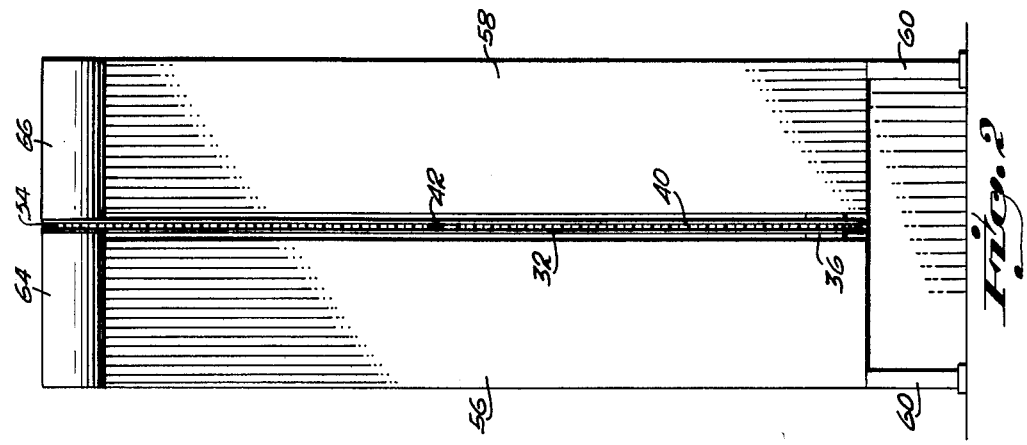
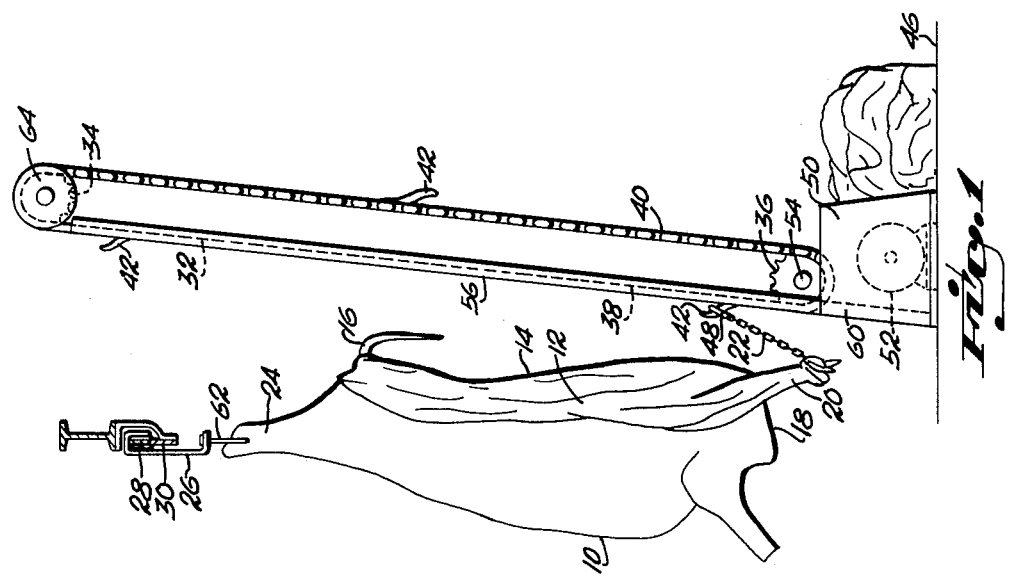
INVENTOR.
WILLIAM C. SCHMIDT
BY
Kinney & Schenk
ATTORNEYS

United States Patent Office 3,235,905
Patented Feb. 22, 1966

3,235,905
HIDE PEELER
William C. Schmidt, Cincinnati, Ohio, assignor to The Cincinnati Butchers' Supply Company, Cincinnati, Ohio, a corporation of Ohio
Filed Dec. 16, 1963, Ser. No. 330,945
4 Claims. (Cl. 17—21)

This invention relates to a hide peeling apparatus.

In the meat packing industry, carcasses of meat animals are customarily dressed with the carcasses suspended by both hind legs from a moving conveyor. As one step of the procedure, the hide of the animal is slit lengthwise along the belly, and is pulled outwardly across both sides of the carcass by means of a mechanical hide-puller while the carcass is suspended by the moving conveyor. The hide-pulling step usually leaves the hide attached to the carcass along the backbone from neck to tail, and necessitates performance of the additional step of completely severing or peeling the hide from the backbone region.

An object of the present invention is to provide a means for facilitating and expediting severance or peeling of a pulled hide, i.e. a partly disassociated hide, from the backbone region of the carcass, while the carcass is normally suspended from a conveyor.

Another object is to provide a means for peeling the hide, subsequently to the hide-pulling operation, without the expenditure of fatiguing manual labor and without delaying advancement of the carcass in the course of further processing.

The foregoing and other objects are attained by the means described herein and as illustrated in the accompanying drawings, in which:

FIG. 1 is a side elevational view of a hide peeler of the invention, shown in operating relationship to a suspended carcass from which the hide is to be peeled.

FIG. 2 is a front elevational view of the hide peeler.

For a proper understanding of the invention, it is necessary to distinguish the terms "hide-pulling" and "hide peeling," as employed in the industry. Hide-pulling refers to that procedure which involves slitting the hide lengthwise along the belly, slicing the hide from the skin at both sides of the slit to form opposed flaps of hide, and then grasping the flaps and stripping the hide laterally of the carcass and along the sides thereof, short of complete disassociation along the backbone region.

The term "hide peeling" refers to the step of disassociating the hide completely from the carcass along the backbone, subsequently to the hide-pulling operation, by peeling the hide lengthwise from the carcass.

In the drawing, 10 indicates a carcass which has been subjected to a hide-pulling operation, which has stripped the hide 12 from the belly and both sides of the carcass, leaving the hide attached along the backbone region 14. Incidental to the hide-pulling procedure, the hide has been cut out around the tail 16, and loosened about the neck 18 to provide a flap 20 capable of being tied to a gripper 22 which may be in the form of a chain or equivalent expedient for gripping the flap.

Gripper 22 is adapted to pull the flap 20 upwardly while the carcass is suspended from both hind legs 24, for peeling the hide from the backbone area in one continuous pass, beginning at the neck and terminating at the tail of the carcass. The carcass of course remains suspended as shown, due to its heavy weight, as the hide is peeled therefrom lengthwise of the backbone.

The carcass is suspended by conventional means, which may include the trolleys 26 having a wheel 28 adapted to roll along an overhead rail 30 from one processing station to another. As shown in the drawing, the carcass and its suspending trolleys are located at the hide-peeling station.

The hide peeling apparatus may include an endless conveyor 32 trained over upper and lower wheels 34 and 36, to provide upwardly and downwardly moving reaches 38 and 40, respectively. The conveyor supports one or more carriers 42, which may be in the form of hooks as shown, upon which an end of the gripper 22 may be detachably impaled or applied for drawing the gripper upwardly to peel off the hide as the endless conveyor reach 38 travels upwardly.

The detachable connection between the gripper 22 and carrier 42 is such that as the carrier moves upwardly about wheel 34 and descends toward the lower wheel 36, the gripper will disassociate itself from the carrier and drop to the floor 46, or possibly into a suitable receptacle, carrying with it the hide peeled from the carcass. As will be understood, the gripper may thereafter be manually detached from the hide flap 20 and used again for the peeling of a carcass later presented to the apparatus.

In the structure herein disclosed by way of example, conveyor 32 may be an endless chain or belt to which several carriers in the form of upwardly projecting hooks 42 are fixed. Any hook may be receptive of a ring 48 on one end of gripper 22, loosely impaled thereon by an attendant who has previously tied the gripper to hide flap 20. The gripper may be in the form of a chain or equivalent flexible member, the lower or gripping end of which may be simply and quickly wrapped about the flap to grip it securely while the hide undergoes peeling.

Conveyor 32 may be supported in a vertical or slightly inclined position upon a base 50, which base may carry a motor 52 and suitable reduction gearing (not shown), for driving conveyor shaft 54 at a proper slow speed enabling the attendant to apply grippers to the hide and attach the grippers to hooks 42, as carcasses move successively into peeling position upon rail 30. Base 50 may be stationary, if desired, or it may be moveable in substantial correspondency with the carcass advancement, so as to peel off the hide without interrupting advancing movement of the carcass.

Conveyor 32 may be flanked by a pair of coplanar back boards or panels 56 and 58 spaced apart to accommodate therebetween the upward reach 38 of the conveyor. The back board structure serves to limit swing of the carcass toward the conveyor during peeling of the hide therefrom. The stanchions 60 of the back-stop may be fixed to base 50 in any suitable manner, and these are preferably inclined upwardly and away from the neck of the suspended carcass, to dispose the peeler conveyor at an inclination favorable to peeling without risking laceration of the hide by hooks 42. The upwardly moving reach of the conveyor, however, may be disposed vertically if desired, in performance of the hide peeling function.

In the preferred construction, the upwardly moving reach of conveyor 32 is longer than the carcass to be peeled, and the upper portion thereof extends a distance above the carcass-supporting trolley hook 62. The lower end of the conveyor may be disposed at an elevation approximating the level of the carcass neck portion.

As FIG. 2 indicates, conveyor sprocket or wheel 34 may be flanked by a pair of smooth elongate rolls 64 and 66, of a diameter approximating that of the sprocket, to provide surfaces over which the peeled hide may be drawn in descent over the top of the conveyor, so that the hide may not be exposed to possible damage by becoming entangled between the conveyor member 32 and its supporting sprocket or wheel 34. As the gripper and the hide thereto attached pass over the rolls 64 and 66, they drop toward the floor at a speed much greater than the rate of descent of a hook 42, so that the gripper ring 48 leaves the hook to which it was applied, and the hook thereby is readied for use on its next upswing relative to a succeeding carcass.

It is to be understood that various modifications and changes may be made in the structural details of the device, within the scope of the appended claims, without departing from the spirit of the invention.

What is claimed is:

1. A hide peeler for removing from a suspended carcass a hide which is attached to the carcass mainly along the backbone region thereof, said hide peeler comprising an endless conveyor including an upper wheel and a lower wheel about which the conveyor is trained to provide upwardly and downwardly traveling reaches suspended from the upper wheel, the upwardly traveling reach being movable lengthwise of the backbone in spaced relation thereto, a hook on the conveyor for movement therewith, said hook being directed upwardly when ascending with the upwardly traveling reach of the conveyor, said hook being inverted when traveling with the downwardly moving reach of the conveyor, an elongate flexible tie member having one end removably attachable to the hide at one end of the carcass, and an opposite end loosely impaled upon the hook, so that the hook in ascending pulls the tie member and the hide attached thereto upwardly over and across the upper wheel of the conveyor, and advances the tie member downwardly with the downwardly traveling hook in inverted condition, until the tie member and the attached hide gravitate away from and off the hook while the latter is inverted during descent of the hook with the downwardly traveling reach of the conveyor, and guide means at opposite sides of the upper conveyor wheel to support the hide as the hide is pulled by the flexible tie member over the periphery of said upper conveyor wheel, said guide means comprising a pair of smooth elongate part-cylindrical rolls flanking the upper conveyor wheel, and formed on a diameter approximating that of said upper wheel, to provide convex surfaces over which the peeled hide may be drawn in descent over the upper wheel without contacting said wheel.

2. A hide peeler for removing from a suspended carcass a hide which is attached to the carcass mainly along the backbone region thereof, said hide peeler comprising an endless conveyor, an upper wheel and a lower wheel about which the conveyor is trained to provide a pair of conveyor reaches, one of which travels upwardly and the other of which travels downwardly as the wheels rotate, means for power rotating one of the wheels in a direction to advance the upwardly traveling reach lengthwise of the carcass backbone in spaced relation thereto, a hook on the conveyor to move therewith, the hook being directed upwardly when ascending, and being inverted when descending with the descending conveyor reach, an elongate flexible tie member having one end removably attachable to the hide at the lower end of the carcass, and an opposite end loosely impaled upon the hook, so that the hook in ascending pulls the tie member and the hide attached thereto upwardly over and across the upper conveyor wheel, and in descending the downward reach the hook inverts and pulls the tie member and hide downwardly, until gravity acts upon the tie member to disassociate the loosely impaled end thereof from the inverted hook, to free the hide and the tie member from connection with the conveyor, and guide means at opposite sides of the upper conveyor wheel to support the hide as the hide is pulled by the flexible tie member over the periphery of said upper conveyor wheel, and guide means at opposite sides of the upper conveyor wheel to support the hide as the hide is pulled by the flexible tie member over the periphery of said upper conveyor wheel, said guide means including aligned, elongated, smooth, curved surfaces flanking the upper conveyor wheel and substantially coincident with the upper curved portion of said wheel to provide convex surfaces over which the peeled hide may be drawn to descend over the upper wheel without contacting said wheel.

3. A hide peeler for removing from a suspended carcass a hide which is attached to the carcass mainly along the backbone region thereof, said hide peeler comprising an endless conveyor, an upper wheel and a lower wheel about which the conveyor is trained to provide a pair of conveyor reaches, one of which travels upwardly and the other of which travels downwardly as the wheels rotate, means for power rotating one of the wheels in a direction to move the upwardly traveling reach lengthwise and in spaced relation to the carcass backbone, a hook on the conveyor to move therewith, the hook when ascending being extended upwardly, and being inverted when descending with the downwardly traveling reach of the conveyor, an elongate flexible tie member having one end removably attachable to the hide at the lower end of the carcass, and an opposite end loosely impaled upon the hook, so the hook in ascending pulls the tie member and the hide attached thereto upwardly over and across the upper conveyor wheel, and in descending the downward reach of the conveyor, pulls said tie member and hide downwardly until the impaled end of the tie member gravitates from the hook to free the tie member and the attached hide from the conveyor, means at opposite sides of the upper conveyor wheel to support the hide as it changes direction from ascent to descent over the upper wheel, and a backstop substantially coextensive with and substantially in the plane of the upwardly traveling conveyor reach, to limit swinging of the suspended carcass toward the conveyor.

4. The hide peeler as set forth in claim 3, wherein the backstop and the upwardly traveling reach of the conveyor are inclined from the vertical, upwardly and away from the lowermost end of the suspended carcass.

References Cited by the Examiner

UNITED STATES PATENTS

| | | | |
|---|---|---|---|
| 537,215 | 4/1895 | Mead | 17—45 |
| 1,265,407 | 5/1918 | Wallin | 17—45 |
| 2,545,718 | 3/1951 | Weber | 17—21 |
| 2,696,633 | 12/1954 | Hincks | 17—21 |
| 2,770,006 | 11/1956 | Wilkens | 17—21 |
| 2,897,537 | 8/1959 | Schmidt | 17—21 |
| 3,046,597 | 7/1962 | Macy et al. | 17—21 |
| 3,129,454 | 4/1964 | Johnson | 17—21 |

OTHER REFERENCES

Wierbicki et al.: "Russian Meat Industry," The National Provisioner, 146(11), pp. 14–18, March 17, 1962.

SAMUEL KOREN, *Primary Examiner.*

LUCIE H. LAUDENSLAGER, *Examiner.*